United States Patent
Shaw

(10) Patent No.: US 10,662,955 B2
(45) Date of Patent: May 26, 2020

(54) VACUUM PUMP LUBRICANTS

(71) Applicant: Edwards Limited, Burgess Hill (GB)

(72) Inventor: Christopher John Shaw, Hurstpierpoint (GB)

(73) Assignee: Edwards Limited, Burgess Hill (GB)

( * ) Notice: Subject to any disclaimer, the term of this patent is extended or adjusted under 35 U.S.C. 154(b) by 0 days.

(21) Appl. No.: 15/566,521

(22) PCT Filed: Mar. 11, 2016

(86) PCT No.: PCT/GB2016/050681
§ 371 (c)(1),
(2) Date: Oct. 13, 2017

(87) PCT Pub. No.: WO2016/166504
PCT Pub. Date: Oct. 20, 2016

(65) Prior Publication Data
US 2018/0106258 A1    Apr. 19, 2018

(30) Foreign Application Priority Data
Apr. 14, 2015   (GB) .................................. 1506339.9

(51) Int. Cl.
*C10M 169/04*    (2006.01)
*C09G 3/00*    (2006.01)
(Continued)

(52) U.S. Cl.
CPC .......... *F04D 19/04* (2013.01); *C10M 103/02* (2013.01); *C10M 107/38* (2013.01);
(Continued)

(58) Field of Classification Search
CPC  C10M 107/38; C10M 125/02; C10M 103/02; C10M 169/04; C10M 2213/062;
(Continued)

(56) References Cited

U.S. PATENT DOCUMENTS

| 5,069,603 A | 12/1991 | Schuetz et al. |
| 5,792,728 A | 8/1998 | Yuan et al. |

(Continued)

FOREIGN PATENT DOCUMENTS

| EP | 2600005 A1 | 6/2013 |
| GB | 2501926 A | 11/2013 |

(Continued)

OTHER PUBLICATIONS

—ombined Search and Examination Report under Sections 17 and 18(3) dated Oct. 15, 2015 in counterpart GB Application No. 1506339.9, 7 pgs.

(Continued)

*Primary Examiner* — Prem C Singh
*Assistant Examiner* — Francis C Campanell
(74) *Attorney, Agent, or Firm* — Shumaker & Sieffert, P.A.

(57) ABSTRACT

A vacuum pump may include a rotor and a stator, wherein the rotor is supported by metal bearings (such as steel bearings) to allow relative rotation of the rotor with respect to the stator. A liquid PFPE lubricant compound is provided to lubricate the bearings, wherein the lubricant further comprises a solid lubricant that is in suspension in the liquid lubricant. The solid lubricant can comprise any of graphite, graphene and molybdenum disulphide. In other words, the inventive concept encompasses a lubricated bearing arranged to support a rotating shaft in a body under sub-atmospheric conditions, wherein a lubricant used to lubricate the bearing comprises liquid PFPE lubricant having a low vapour pressure, and a solid lubricant that is held in suspension in the liquid lubricant. The solid lubricant may comprise any of graphite, graphene and molybdenum disulphide.

8 Claims, 2 Drawing Sheets

(51) Int. Cl.
  *F04D 19/04* (2006.01)
  *F04D 29/063* (2006.01)
  *C10M 103/02* (2006.01)
  *C10M 107/38* (2006.01)
  *F16N 15/02* (2006.01)

(52) U.S. Cl.
  CPC ......... *C10M 169/04* (2013.01); *F04D 29/063* (2013.01); *F16N 15/02* (2013.01); *C10M 2201/041* (2013.01); *C10M 2201/066* (2013.01); *C10M 2213/062* (2013.01); *C10M 2213/0606* (2013.01); *C10N 2250/12* (2013.01)

(58) Field of Classification Search
  CPC ...... C10M 2201/066; C10M 2201/041; C10M 2213/0606; F04D 19/04; F04D 29/063; F16N 15/02; C10N 2250/12
  USPC .................................................. 508/113, 590
  See application file for complete search history.

(56) References Cited

U.S. PATENT DOCUMENTS

| | | | |
|---|---|---|---|
| 7,709,424 B2 | 5/2010 | Shimura et al. | |
| 2005/0233912 A1 | 10/2005 | Dusing et al. | |
| 2008/0167208 A1* | 7/2008 | Hashida | C10M 107/38 508/582 |
| 2012/0035309 A1 | 2/2012 | Zhu et al. | |
| 2012/0201487 A1 | 8/2012 | Kverel | |
| 2013/0130951 A1 | 5/2013 | Sinha et al. | |
| 2014/0023540 A1 | 1/2014 | Heidecker et al. | |
| 2014/0212587 A1* | 7/2014 | Malshe | C10M 171/06 427/331 |
| 2015/0275902 A1* | 10/2015 | Patey | F04D 19/042 415/14 |

FOREIGN PATENT DOCUMENTS

| | | |
|---|---|---|
| JP | 2003096480 A | 4/2003 |
| JP | 2003343579 A | 12/2003 |
| JP | 2006131874 A | 5/2006 |
| JP | 2009063154 A | 3/2009 |
| JP | 2013001849 A | 1/2013 |
| JP | 2013117308 A | 6/2013 |
| WO | 2006057273 A1 | 6/2006 |

OTHER PUBLICATIONS

International Search Report and the Written Opinion of the International Searching Authority dated May 30, 2016 in counterpart International Application No. PCT/GB2016/050681, 14 pgs.

Office Action, and translation thereof, from counterpart Japanese Application No. 2017-554328 dated Dec. 23, 2019, 7 pp.

* cited by examiner

VACUUM PUMP LUBRICANTS

This application is a national stage entry under 35 U.S.C. § 371 of International Application No. PCT/GB2016/050681, filed Mar. 11, 2016, which claims the benefit of G.B. Application 1506339.9, filed Apr. 14, 2015. The entire contents of International Application No. PCT/GB2016/050681 and G.B. Application 1506339.9 are incorporated herein by reference.

TECHNICAL FIELD

The disclosure relates to vacuum pump lubricants and in particular lubricant systems and compounds for lubricating the bearings in vacuum pumps.

BACKGROUND

Vacuum pumps typically comprise an impeller in the form of a rotor mounted on a rotor shaft for rotation relative to a surrounding stator. The rotor shaft is supported by a bearing arrangement that may comprise two bearings located at or intermediate respective ends of the shaft. One or both of these bearings may be a rolling bearing.

A typical known rolling bearing comprises an inner race fixed relative to the rotor shaft, an outer race and a plurality of rolling elements located between the races for allowing relative rotation of the inner race and the outer race. To prevent mutual contact between the rolling elements, they are often guided and evenly spaced by a cage. Adequate lubrication is essential to ensure accurate and reliable operation of rolling bearings. The main purpose of the lubricant is to establish a load-carrying film separating the bearing components in rolling and sliding contact in order to minimise friction and wear. Other purposes include the prevention of oxidation or corrosion of the bearing components, the formation of a barrier to contaminants and the transfer of heat away from the bearing components.

The lubricant is generally in the form of either oil or grease (a mixture of oil and a thickening agent). However, certain lubricants are not suitable for certain vacuum pump configurations and certain applications on which the vacuum pump is operating. In particular some industrial applications require the vacuum pump to operate without causing any contamination in the chamber that the pump is evacuating. As a result, hydrocarbon oils having a low vapour pressure might be considered as suitable for use within the vacuum pump mechanism. However, the vacuum pump designer also has to consider the chemistry of gases that pass through the pump during evacuation of a chamber. Thus, a lubricant has to be selected that would not react chemically with the gases passing through the pump. Further considerations also need to be given to the operating temperature of the pump. Lubricants have an optimum operating temperature parameter window and some lubricants are known to degrade if they are exposed to operating temperatures above a threshold.

For example, in the manufacture of certain semi-conductor products an ultra-clean environment is required in the process chamber. This can be achieved by utilising so-called dry vacuum pumps where the pump's swept volumes are free from any sealing fluid used to seal the gap between the pump rotor and stator. Such dry vacuum pumps also use ball bearings to facilitate rotation of the rotor shaft. The bearings are also required to operate in an environment of reduced pressure. Thus, synthetic lubricants are used to lubricate the bearings in order to try and prevent contamination of the evacuated chamber that may otherwise occur if certain hydrocarbon lubricants were used to lubricate the bearings. Furthermore, the chemical stability and operating temperature range of certain synthetic lubricants makes this type of lubricant an attractive proposition for use in vacuum pumps. Suitable synthetic lubricants having a suitably chemical inert nature for use in semiconductor processing applications include compounds that are collectively known as perfluoropolyether (PFPE). Additionally, some PFPE compounds are known to have a suitably low vapour pressure, making such compounds suitable for vacuum applications. An example of such a compound is sold under the registered trademark FOMBLIN.

SUMMARY

However, the known synthetic lubricants currently used in vacuum applications exhibit relatively poor lubrication properties compared to hydrocarbon compound lubricants (which are not suitable for use in vacuum pumps, as described above). As a result, conventional steel bearings do not provide the best performance when PFPE lubricants are used. Hence, different bearing materials can be used to improve bearing life and robustness. For instance, ceramic ball bearings have been found to provide adequate performance when used in conjunction with PFPE lubricants. Such ceramic bearings are however relatively expensive compared to metal or steel bearings. Furthermore, the use of ceramic bearings can constrain the design of pump components and operational characteristics due to different bearing performance compared to steel or metal bearings.

There is a desire to reduce the cost of vacuum pump bearings and lubricants.

In order to address this desire, the present disclosure is directed to a vacuum pump comprising a rotor and a stator, wherein the rotor is supported by metal bearings (such as steel bearings) to allow relative rotation of the rotor with respect to the stator. A liquid PFPE lubricant compound is provided to lubricate the bearings, wherein the lubricant further comprises a solid lubricant that is in suspension in the liquid lubricant. The solid lubricant can comprise any of graphite, graphene and molybdenum disulphide. In other words, the disclosure encompasses a lubricated bearing arranged to support a rotating shaft in a body under sub-atmospheric conditions, wherein a lubricant used to lubricate the bearing comprises liquid PFPE lubricant having a low vapour pressure, and a solid lubricant that is held in suspension in the liquid lubricant. The solid lubricant may comprise any of graphite, graphene and molybdenum disulphide.

More particularly there is provided a vacuum pump comprising: a rotor mounted inside a stator; at least one roller bearing arrangement disposed on a shaft of the rotor to allow rotation of the rotor with respect to the stator; and a lubrication supply arranged to supply a lubricant compound to the roller bearing, wherein the lubricant compound comprises a liquid and a solid component, the liquid component comprising a PFPE lubricant, the solid component comprising one or more of graphite, graphene or molybdenum sulphide held in suspension within the liquid component.

In another aspect of the present disclosure there is provided a vacuum pump lubricant comprising a solid and a liquid component, the solid component forming a suspension in the liquid component, wherein the liquid component is a PFPE lubricant and the solid component is any one of graphite, graphene or molybdenum sulphide.

As a result, these aspects of the present disclosure provide a cost effective solution to the problems discussed above. The solid component held in suspension within the liquid lubricant enables the use of metallic roller bearings because the solid lubricant forms a layer of material on the moving parts of the metal bearings such that the operational life of the bearing is greatly extended when compared to the use of metal bearings lubricated by low vapour pressure synthetic lubricants. In other words, the addition of the solid lubricant in the PFPE vacuum lubricant enables vacuum pumps to use metal (steel) roller bearings as opposed to the more expensive ceramic bearings that have been used to date. As a result, the cost of making and running vacuum pumps that incorporate the present disclosure can be reduced significantly.

DETAILED DESCRIPTION

Embodiments of the present disclosure are now described by way of example. The skilled person understands that the disclosure is not limited to the embodiments that we describe herein and other alternative embodiments can be used without leaving the scope of the general disclosure.

FOMBLIN® is a known synthetic PFPE lubricant that can be used in vacuum applications. In particular, this lubricant is used in vacuum pumps to lubricate roller bearings disposed between the pump's rotor and stator. Typically however, FOMBLIN® is most effective in vacuum pump applications when used in combination with ceramic bearings in order to achieve adequate bearing performance.

We believe that FOMBLIN® can now be used effectively in vacuum pumps having metal or steel roller bearings when a solid lubricant is added in suspension into the FOMBLIN®. The addition of the solid lubricant is thought to provide an additional lubrication layer between the steel bearing components so that the operational life of the steel bearings is prolonged to an extent that it is now economically viable to use steel bearings in vacuum pump applications.

The solid lubricant can comprise graphite in a powered form, molybdenum disulphide or graphene. The solid lubricant is held in suspension within the liquid lubricant (for example, FOMBLIN®). The ratio of solid to liquid lubricant depends on the pump design and the industrial application that the pump is used in. For example, the use of a pump on a relatively harsh semiconductor manufacturing process, where highly corrosive gases pass through the vacuum pump during processing, then a higher/lower concentration of solid lubricant may be required when compared to a relatively lighter duty cycle. Additionally, if the vacuum pump is running continuously over a long periods of time (for example, several months or even years), then more solid lubricant may be required when compared to a pump that has a relatively lighter duty cycle. The ratio of solid lubricant to liquid PFPE would be in the region of concentrations levels 0.001% to 10% by volume of solid materials to liquid lubricant or more specifically a range of 0.01% to 1% depending on applications for the vacuum pump.

Figure 1:
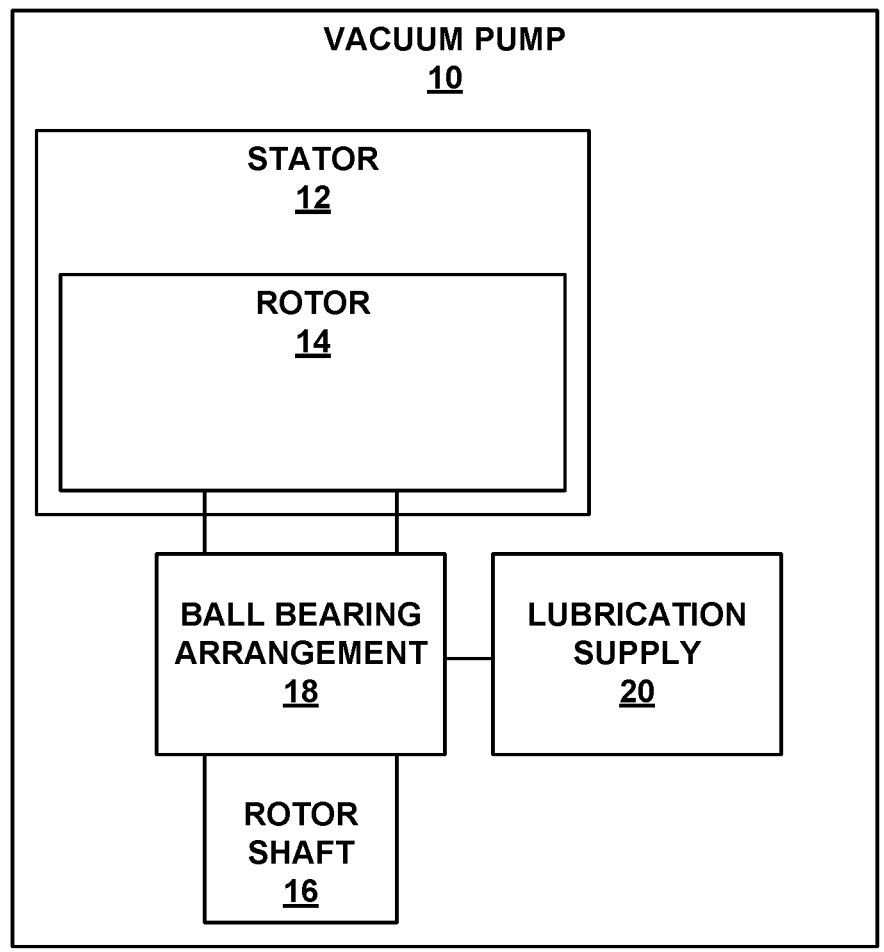
FIG. 1 is a conceptual diagram illustrating an example vacuum pump.

FIG. 1 is a conceptual diagram illustrating an example vacuum pump 10. In vacuum pump 10, the lubricant described above can be circulated throughout the components requiring lubrication within a lubrication supply 20 and a recirculation circuit. The liquid lubricant containing the solid lubricant held in suspension is stored in a lubricant reservoir from where it can be delivered under gravity or by means of a suitable lubricant pump to a bearing that requires lubrication.

Figure 2:
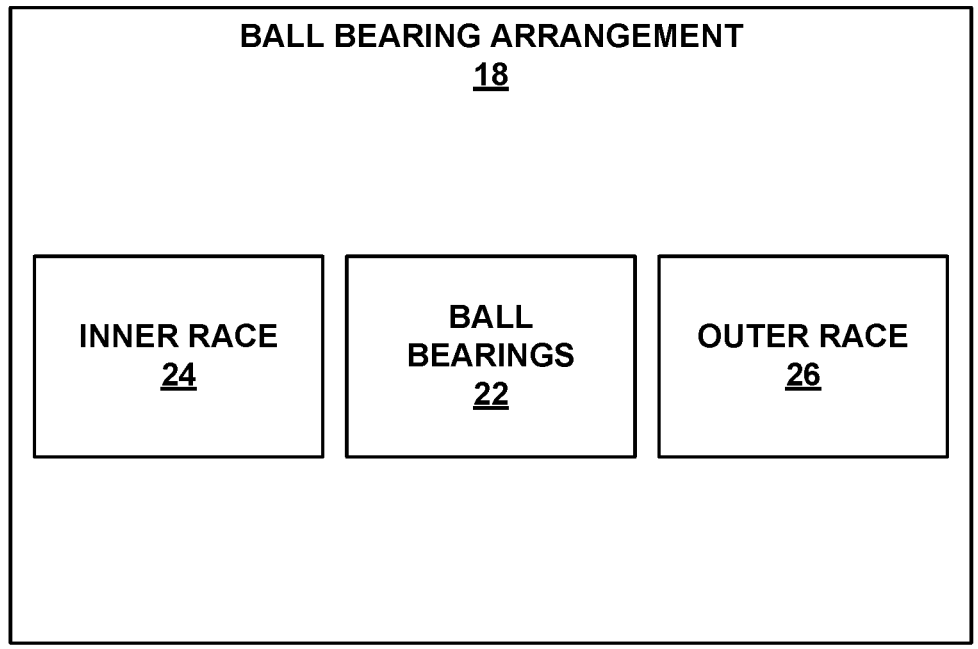
FIG. 2 is a conceptual diagram illustrating an example roller bearing arrangement.

Typically the bearing is disposed on a rotor shaft 16 to allow rotation of the rotor 14 when it is mounted in the pump's stator 12. The bearing is a known ball bearing arrangement 18 comprising an inner and outer race 24 and 26, respectively, with ball bearings 22 disposed between the races, as shown in FIG. 2. A cage is used to locate and maintain appropriate spacing between the steel balls and allow the bearing to function in the usual manner. Lubricant is required on the balls to maintain operation of the pump 10 between service intervals.

Thus, the lubricant (comprising both solid and liquid components) is supplied to the bearings and returned to the lubricant reservoir through a lubricant circuit. As a result, the lubricant is able to continually circulate to the components that require lubrication. In order to maintain the solid lubricant in a suspension within the liquid a means to agitate the lubricant might be needed. The agitation means may comprise a driven stirrer, or the recirculation of the lubricant can be designed to pass over a component that causes turbulence in the flow of lubricant to stir the suspension and hence keep the solid lubricant in suspension.

Other types of synthetic lubricant can be used and the disclosure is not limited to FOMBLIN®. Other suitable lubricants include those that are sold under the brands KRYTOX® and KLUEBER®. Additionally, modified or different solid lubricants can be used in suitable powered form. For example, in the case of graphene, the graphene may be functionalised with appropriate molecule groups or molecular chains to aid dispersion of the graphene in the PFPE oil. For instance, fluorinated long chain hydrocarbons, possibly including fluorinated organothiol, might be suitable, depending on the requirements. Furthermore, the graphite suspension can comprise powdered graphite, or graphite formed into nanostructures such as spherical fullerenes (so-called bucky-balls) or cylindrical fullerenes such as carbon nano-tubes.

The invention claimed is:
1. A vacuum pump comprising:
a rotor mounted inside a stator;
at least one roller bearing arrangement disposed on a shaft of the rotor to allow rotation of the rotor with respect to the stator; and
a lubrication supply arranged to supply a lubricant compound to the roller bearing, wherein the lubricant compound comprises a liquid and a solid component, the liquid component comprising a PFPE lubricant, the solid component comprising graphene held in suspension within the liquid component, wherein the graphene is functionalized with a fluorinated organothiol for improved dispersion in the liquid component.
2. The vacuum pump according to claim 1, wherein the roller bearing arrangement comprises metal ball bearings disposed between inner and outer races, said races being made from metal.
3. The vacuum pump according to claim 1, wherein the liquid component comprises a PFPE compound having a low vapour pressure suitable for use at sub-atmospheric pressures without causing contamination of a chamber that the vacuum pump is evacuating.

4. The vacuum pump according to claim 1, wherein the solid component comprises between 0.001% to 10% of total volume of the lubricant.

5. The vacuum pump according to claim 4, wherein the solid component comprises between 0.01% to 1% of total volume of the lubricant.

6. A vacuum pump lubricant comprising:
a solid component; and
a liquid component, wherein the solid component is held in a suspension in the liquid component, and wherein the liquid component is a PFPE lubricant and the solid component comprises graphene, wherein the graphene is functionalized with a fluorinated organothiol for improved dispersion in the liquid component.

7. The vacuum pump of claim 1, wherein the solid component further comprises at least one of graphite or molybdenum sulphide.

8. The vacuum pump lubricant of claim 6, wherein the solid component further comprises at least one of graphite or molybdenum sulphide.

* * * * *